United States Patent
Hsu

(10) Patent No.: US 6,573,634 B2
(45) Date of Patent: Jun. 3, 2003

(54) METHOD AND MACHINE FOR HIGH STRENGTH UNDIFFUSED BRUSHLESS OPERATION

(75) Inventor: John S. Hsu, Oak Ridge, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/872,048

(22) Filed: Jun. 1, 2001

(65) Prior Publication Data

US 2002/0180303 A1 Dec. 5, 2002

(51) Int. Cl.$^7$ .............................. H02K 1/22; H02K 21/04
(52) U.S. Cl. ........................ 310/266; 310/268; 310/181; 310/186; 310/179; 310/156.07
(58) Field of Search .............................. 310/186, 156.07, 310/266, 268, 181

(56) References Cited

U.S. PATENT DOCUMENTS

| | | | |
|---|---|---|---|
| 3,132,272 A | * 5/1964 | MacFarlane | 310/168 |
| 4,641,080 A | * 2/1987 | Glennon et al. | 310/152 |
| 4,831,300 A | * 5/1989 | Lindgren | 310/113 |
| 4,959,578 A | * 9/1990 | Varga | 310/114 |
| 5,130,595 A | * 7/1992 | Arora | 310/268 |
| 5,825,116 A | * 10/1998 | Ishikawa | 310/263 |
| 5,886,445 A | 3/1999 | Hsu | 310/211 |
| 5,929,579 A | 7/1999 | Hsu | 318/439 |
| 5,965,967 A | * 10/1999 | Liang et al. | 310/263 |
| 6,013,968 A | * 1/2000 | Lechner et al. | 310/263 |
| 6,057,622 A | * 5/2000 | Hsu | 310/191 |
| 6,166,463 A | * 12/2000 | Woodward, Jr. | 310/190 |
| 6,404,097 B1 | * 6/2002 | Pullen | 310/156.62 |

* cited by examiner

Primary Examiner—Nestor Ramirez
Assistant Examiner—J. Aguirrechea
(74) Attorney, Agent, or Firm—Quarles & Brady LLP

(57) ABSTRACT

A brushless electric machine (30) having a stator (31) and a rotor (32) and a main air gap (34), the rotor (32) having pairs of rotor pole portions (22b, 22c, 32f, 32l) disposed at least partly around the axis of rotation (32p) and facing the main air gap (24b, 24c, 34), at least one stationary winding (20b, 20c, 33b) separated from the rotor (22b, 22c, 32) by a secondary air gap (23b, 23c, 35) so as to induce a rotor-side flux in the rotor (22b, 22c, 32) which controls a resultant flux in the main air gap (24b, 24c, 34). PM material (27b, 27c) is disposed in spaces between the rotor pole portions (22b, 22c, 32f, 32l) to inhibit the rotor-side flux from leaking from said pole portions (22b, 22c, 32f, 32l) prior to reaching the main air gap (24b, 24c, 34). By selecting the direction of current in the stationary winding (20b, 20c, 33b) both flux enhancement and flux weakening are provided for the main air gap (24b, 24c, 34). The stationary windings (31a, 33b) which are used for both primary and secondary excitation allow for easier adaptation to cooling systems as described. A method of non-diffused flux enhancement and flux weakening is also disclosed.

18 Claims, 8 Drawing Sheets

AIR-GAP FLUX DENSITY (kGAUSS) VS. AMPERE-TURNS

AIR-GAP FLUX DENSITY (kGAUSS) VS. AMPERE-TURNS

METHOD AND MACHINE FOR HIGH STRENGTH UNDIFFUSED BRUSHLESS OPERATION

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is brushless machines, including both AC and DC machines, including both motors and generators, and including induction machines, permanent magnet (PM) machines and switched reluctance machines.

DESCRIPTION OF THE BACKGROUND ART

There are three major types of brushless electric machines available for the electric vehicle (HV) and hybrid electric vehicle (HEV) drive systems. These are the induction machine, the PM machine, and the switched-reluctance machine.

In an induction motor, operation at higher speeds is provided by field weakening in the constant power speed range. An induction machine is robust and requires only a relatively simple power electronics drive. However, the rotor of an induction machine produces considerable resistance heating as a result of current produced in the rotor during operation. In an electrical vehicle this would provide a significant source of heat that should be cooled.

Permanent magnet (PM) machines have been recognized for having a high power density characteristic. A PM rotor does not generate copper losses. One drawback of the PM motor for the above-mentioned applications is that the air gap flux produced by the PM rotor is fixed, and therefore, a sophisticated approach is required for high speed, field weakening operation. Another constraint is that inductance is low, which means that current ripple must be controlled.

The switched reluctance motor is another type of machine that does not have the copper loss of the induction machine. However, a complicated control and sensor system is required to provide sufficient torque over its range of operation.

The direct current (DC) brush-type motors have a long history. The maintenance of the brushes that conduct the electric current from the stator to the rotor is a major reason limiting the application development. Hsu, U.S. Pat. No. 5,929,579, issued Jul. 27, 1999, discloses advanced brush and soft commutation technologies.

Electric and magnetic phenomena are closely related in such machines. As disclosed in Hsu, U.S. patent application No. 09/475,591, filed Dec. 3, 1999, and entitled "Hybrid Secondary Uncluttered Machine," DC magnetomotive force (mmf) may be transferred from a stator to a rotor without using brushes and without a significant core loss. As further disclosed in Hsu, U.S. Pat. No. 6,057,622, issued May 2, 2000, and entitled "Direct Control of Air Gap Flux", a stator core section with a winding can be added to the basic stator to reduce flux in the main air gap for field weakening operation. When the magnetic flux is guided by ferrous material, flux leakage can become a major problem. PM elements may be used to "guide" the flux as disclosed in Hsu, "Flux Guides for Permanent Magnet Machines," PES/IEEE Transactions on Energy Conversions Paper No. PE-007EC, March, 2001. In order to differentiate the flux leakage between the rotor poles and the flux leakages elsewhere in an electric machine, the flux leakage between rotor poles is referred to herein as "flux diffusion."

In order to overcome the above problems, including "flux diffusion," the invention provides a novel machine described below.

SUMMARY OF THE INVENTION

This invention provides a new type of machine for transferring mmf from a stationary winding to a rotor without the use of brushes or rotating windings.

The invention is incorporated in a brushless electric machine having a stator and a rotor spaced from the stator to define a main air gap. The rotor has an axis of rotation and has pairs of rotor pole portions disposed at least partly around the axis of rotation and facing the main air gap, with the pairs of rotor pole portions being spaced from each other to provide spaces. A stationary excitation winding with at least one coil is adapted for receiving direct current from an external source and is positioned next to the rotor so as to induce a rotor-side flux in the rotor which increases a resultant flux in the main air gap when the direct current is of a first polarity and which reduces resultant flux in the main air gap when the direct current is of a second polarity opposite said first polarity. PM material is disposed in spaces between the rotor pole portions to inhibit the rotor-side flux from leaking from said pole portions prior to reaching the main air gap.

The invention provides stationary windings in the stator and avoids the use of any rotating windings. This allows for cooling systems to be added to cool the areas around the stationary windings.

The invention is applicable to both AC and DC machines, and to both motors and generators.

The invention is disclosed in terms of a preferred embodiment in an axial gap configuration, however, the invention is also applicable to radial gap machines.

The invention is also practiced in a method of controlling flux in a brushless electrical machine having a stator with a stationary, primary excitation winding and a rotor separated by a main air gap, with the rotor having a portion facing the main air gap. The method comprises inducing a first flux in the rotor from the stator across the main air gap; passing a direct current through a stationary coil; positioning said stationary coil so as to induce a second flux in the rotor from a position separated from the main air gap by at least a portion of the rotor; and providing portions of PM material at least partly around said portions of the rotor separating the coil from the main air gap so as to prevent leakage of the second flux induced in the rotor before reaching the main air gap.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

DETAILED DESCRIPTION OF THE PREFERRED EMBODIMENTS

Figure 1A:
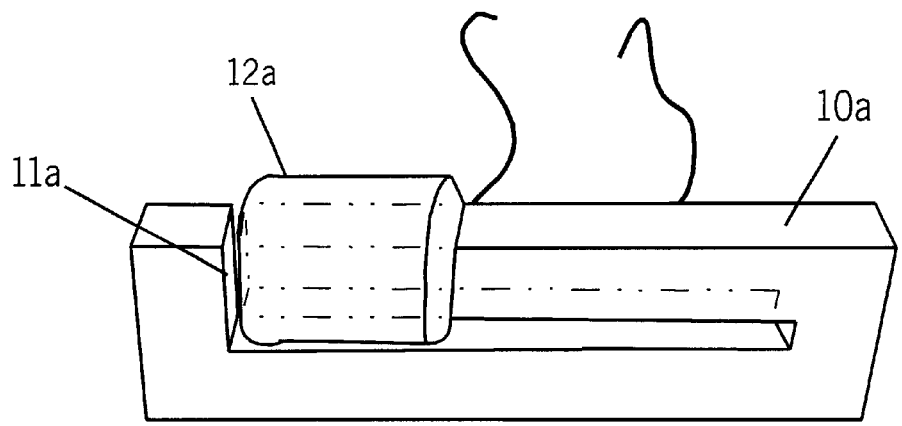
FIGS. 1a and 1b are perspective views of a simplified iron core and excitation coil apparatus for illustrating flux diffusion.
Figure 1B:
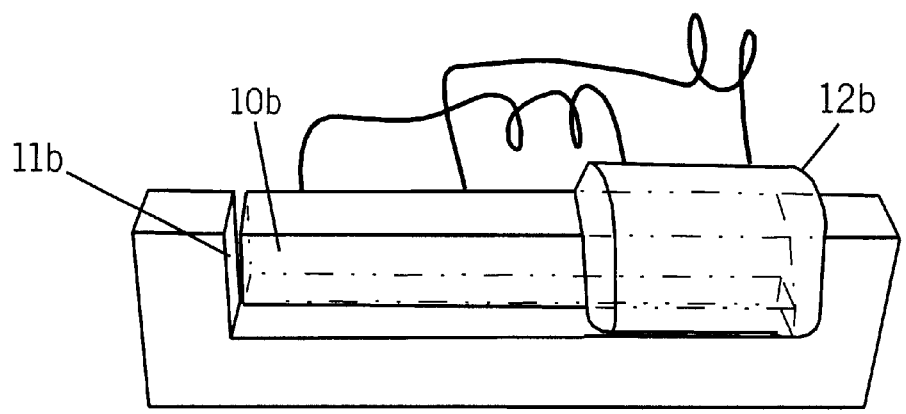

FIGS. 1a and 1b show a test apparatus for illustrating the concept of flux diffusion. An iron core 10a, 10b has an air gap 11a, 11b, respectively, and a toroidally wound excitation coil 12a, 12b, respectively. In FIG. 1a the excitation coil 12a is located right next to the main air gap 11a, while in FIG. 1b, the excitation coil 12b is located a considerable distance away from the main air gap 11b.

The length of the main air gap 11a, 11b in both cases of FIG. 1 is 0.11 inches. This relatively large gap is provided to accommodate a Hall effect probe (not shown) for measurement of the air gap flux density.

Figure 2:
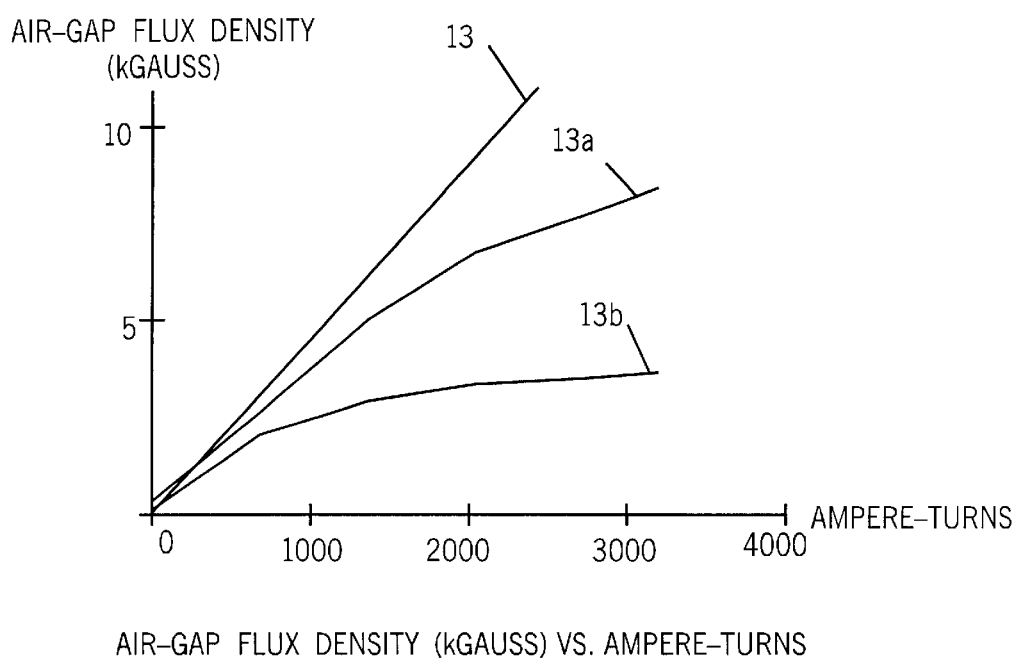
FIG. 2 is a graph of flux density (B) vs. field intensity (H) for the apparatus of FIGS. 1a and 1b.

Referring to FIG. 2, the lower two curves 13a, 13b show the variation of main air gap flux density ($B_g$) with respect to field intensity (H), also referred to as mmf (magnetomotive force), in ampere-turns of the excitation coil, for the two situations illustrated in FIGS. 1a and 1b. The upper curve 13 gives the ampere-turn-drop provided by the main air gap 11a, 11b.

The lowest curve 13b indicates that for a given value of ampere-turns, the excitation coil 12b which is located away from the air gap 11b, produces a lower flux density in the air gap 11b. This occurs because more "flux diffusion" is experienced along the iron core 10b between the coil 12b and the air gap 11b than when the coil 12a is closer to the air gap 11a. The middle curve 13a shows that a significant increase of the main air gap flux density when the excitation coil 12a is located closer to the air gap 11a. A comparison of the middle curve 13a and the uppermost curve 13 shows that when the excitation coil is located close to the air gap, most of the mmf is required for the ampere-turn drop of the air gap. The middle curve 13a shows an increasing saturation effect when the flux density becomes greater. It should be noted that when the air gap is smaller, the flux densities of the three curves for a given mmf would be higher than those shown in the figure. The curves would all move closer to the vertical axis.

Figure 3A:
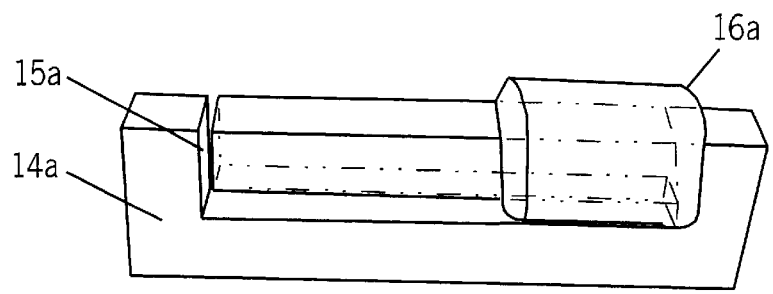
FIG. 3a–FIG. 3f are schematic diagrams of the apparatus of FIG. 1b with various configurations of PM material.
Figure 3B:
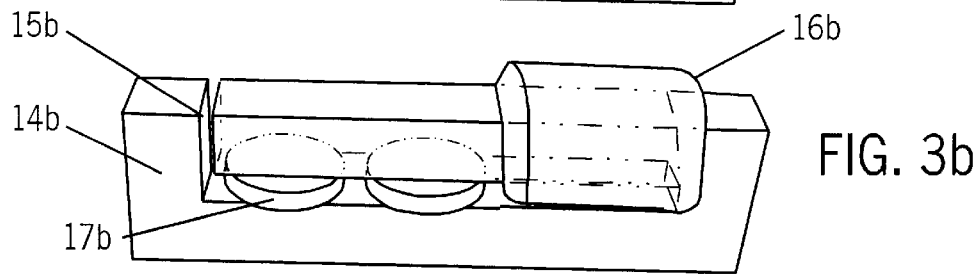
Figure 3C:
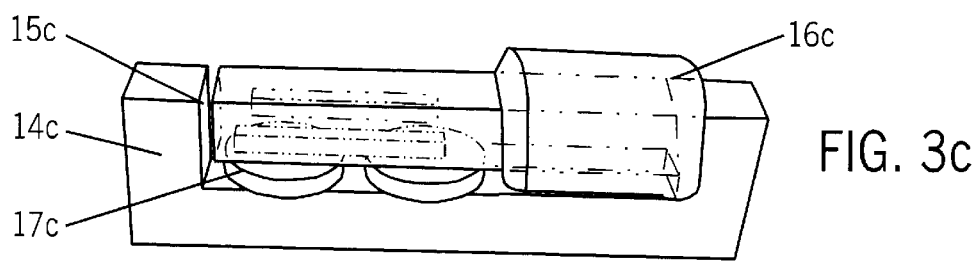

FIGS. 3a–3f shows possible solutions to the problem of flux diffusion in the case of FIG. 1b above. FIG. 3a is similar to FIG. 1b. In FIG. 3b, permanent magnet (PM) material 17b, is introduced to partly reduce flux diffusion. Greater amounts of PM material 17c–17f and 18e and 18f are introduced in FIGS. 3c to 3f to further reduce flux diffusion.

Figure 3D:
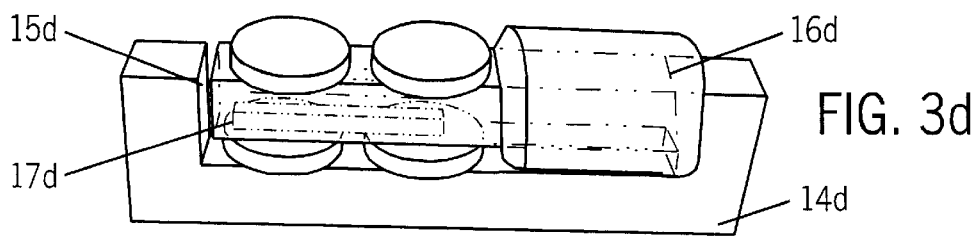
Figure 3E:
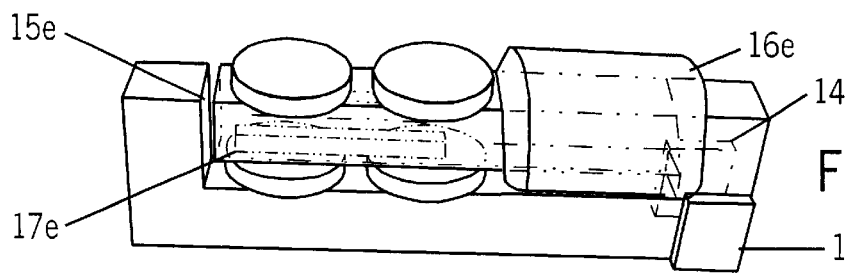
Figure 3F:
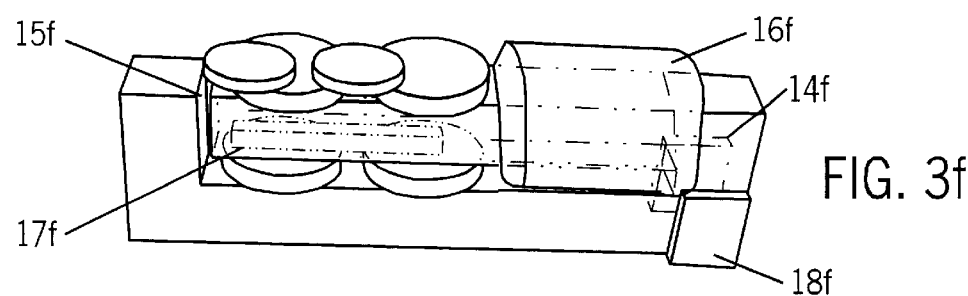

The greatest reduction occurs when the core section is completely encased in PM material as seen in FIG. 3f. In addition, elements 18e and 18f have been added on the other side of the coils 16e and 16f as seen in FIGS. 3e and 3f.

Figure 4:
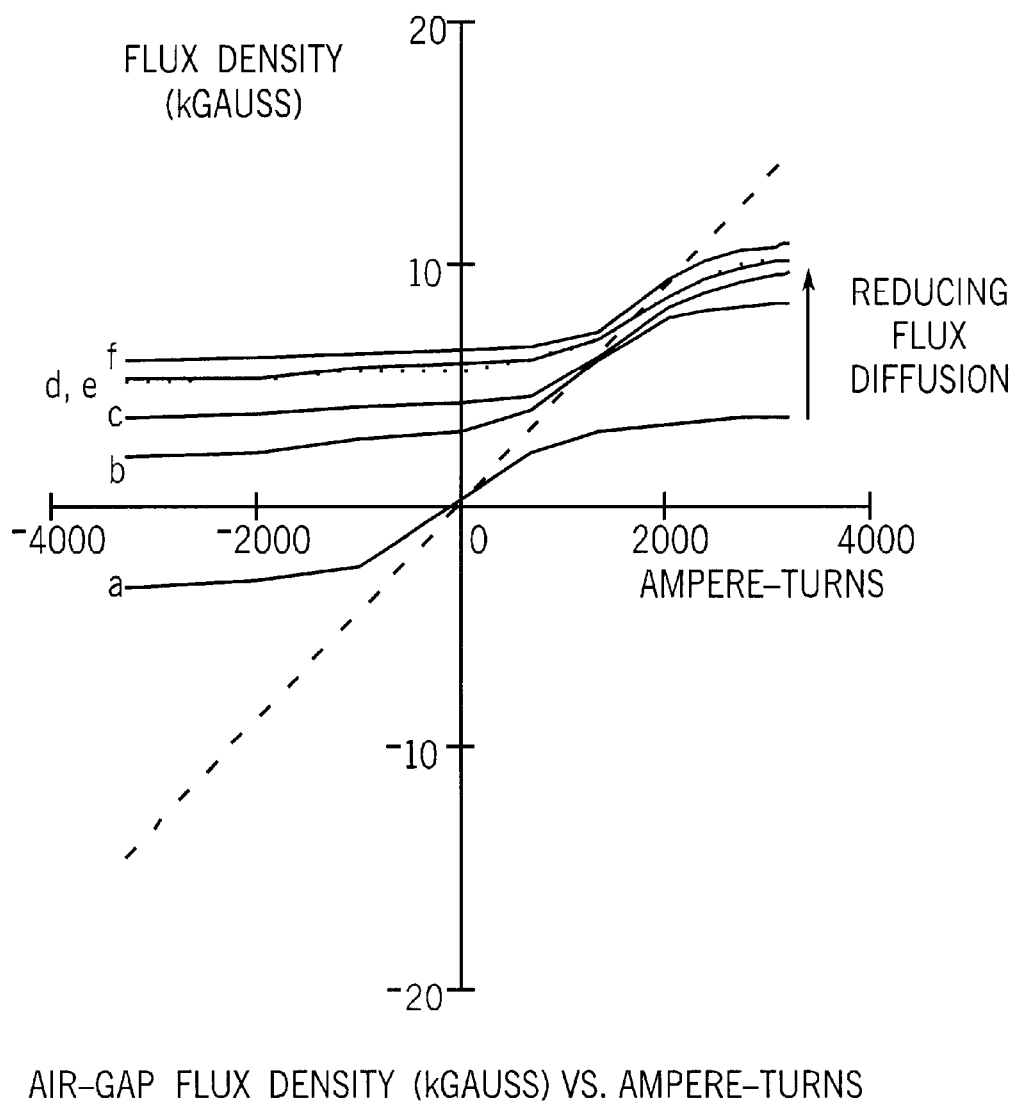
FIG. 4 is a graph of flux density (B) vs. field intensity (H) for the arrangements in FIGS. 3a–3f.

FIG. 4 shows the magnetization curves (B vs. H) for the apparatus of FIGS. 3a to 3f. The curve corresponding to FIG. 3a is labeled "a"; the curve corresponding to FIG. 3b is labeled "b" and the remaining curves "c"–"f" correspond to FIGS. 3c to 3f.

The curves "d" and "e" in FIG. 4 corresponding to the examples in FIGS. 3d and 3e show little difference by adding PM element 18e on the other side of a pole as shown in FIG. 3e. The most effective arrangement is found by wrapping a pole, on one side of the excitation coil, as completely as possible as shown in FIG. 3f. For a given mmf of the excitation coil, the main air gap flux density will increase when the gap becomes smaller. This is due to a smaller mmf drop across the main air gap and a lower counter mmf acts on the PM material. Again, the curves with a smaller air gap would move closer to the vertical axis.

To control flux in the main air gap in a brushless motor, it is advantageous to provide a stationary DC excitation coil that is not a part of the rotor. FIGS. 5a–5c and FIG. 6 provide a secondary air gap 23a–23c, 35 between this stationary DC excitation coil 20a–20c, 32b and the rotor 22a–22c, 32.

Figure 5A:
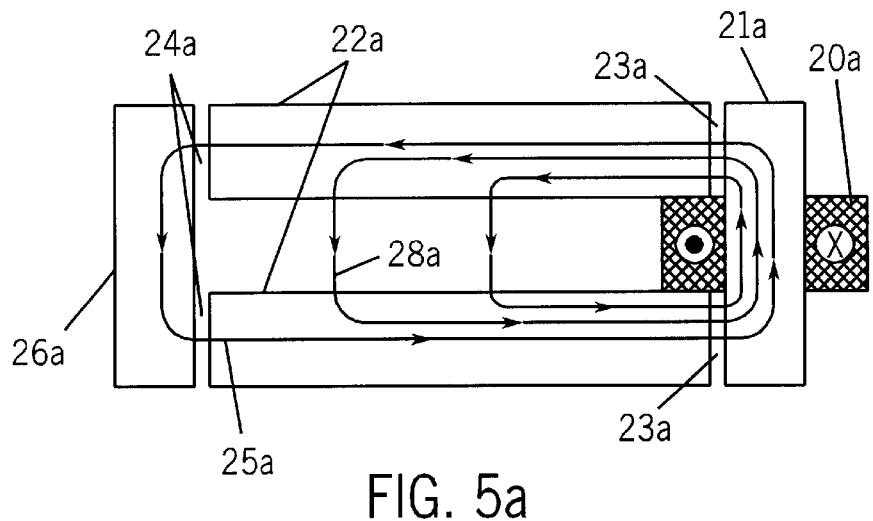
FIGS. 5a–5c are schematic diagrams of a simplified stator and rotor apparatus showing three states of operation: a) diffused flux, b) enhanced air main gap flux with the addition of PM material and c) reversed excitation for field weakening operation.
Figure 5B:
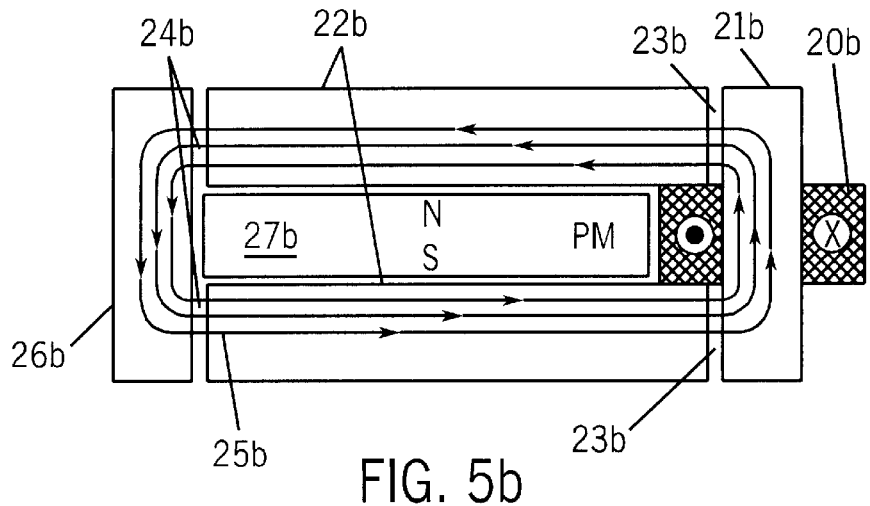
Figure 5C:
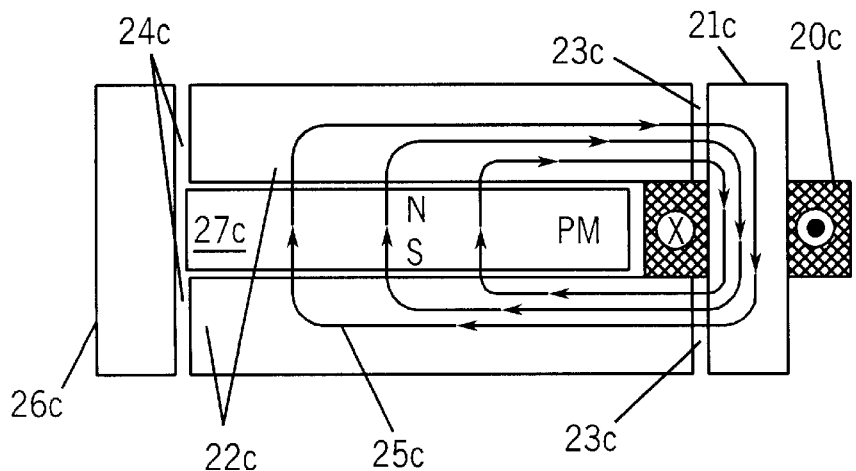

FIGS. 5a–5c illustrate a simplified stator and rotor apparatus showing three states of operation: a) diffused flux, b) enhancement of main air gap flux with the addition of PM material and c) reversed excitation for reducing flux in the air gap in a field weakening operation. It should be noted that only a portion of the desired PM material has been represented in FIGS. 5b and 5c, with it being understood that additional material can be added according to FIG. 3f.

The main air gap flux density of a PM machine can be increased with an additional excitation coil 20a–20c, 33b as seen in FIGS. 5a–5c and 6. These diagrams also illustrate how PM material will discourage flux diffusion.

FIG. 5a shows the flux components 25a traveling through the iron core 22a of the rotor, the iron core of the stator 26a, the main air gap 24a on the left-hand side, and the excitation coil 20a supported on an additional stator iron core 21a providing a secondary air gap 23a on the right hand side of the rotor 22a. When the current flows in the excitation coil 20a, magnetic fluxes are produced in the iron cores 21a, 22a, 26a. The main air gap flux 25a is not the total flux produced by the coil 20a. A significant portion of the flux is shown as the diffused flux 28a which passes between pole portions 22a of the rotor core.

FIG. 5b shows that in order to enhance the main air gap flux 25b, PM material 27b is placed between the upper and lower pole pieces 22b of the rotor or around a pole as those shown in FIG. 3f. The PM material 22b in the rotor produces flux in the main air gap 24b and also inhibits magnetic flux diffusion between the poles 22b. Thus, it enhances the usable main air gap flux density.

FIG. 5c shows that by reversing the direction or polarity of the current in the excitation coil 20c, the main air gap flux is weakened by removing the component provided by coil 20c. This provides a simple field weakening feature in the main air gap 24c of the machine of the present invention.

For a conventional PM machine the air-gap flux density is about 0.6 to 0.8 Teslas and cannot be weakened without the aid of some sophisticated power electronics. Both the stationary excitation coil and the PM material in the rotor maximize rotor flux in the PM machine of the present invention. It can produce two to three times the air gap flux density of a conventional PM machine. Because the torque produced by an electric machine is directly proportional to the air gap flux density, a higher torque, more powerful machine is provided with only small additions to size and weight.

Figure 6:
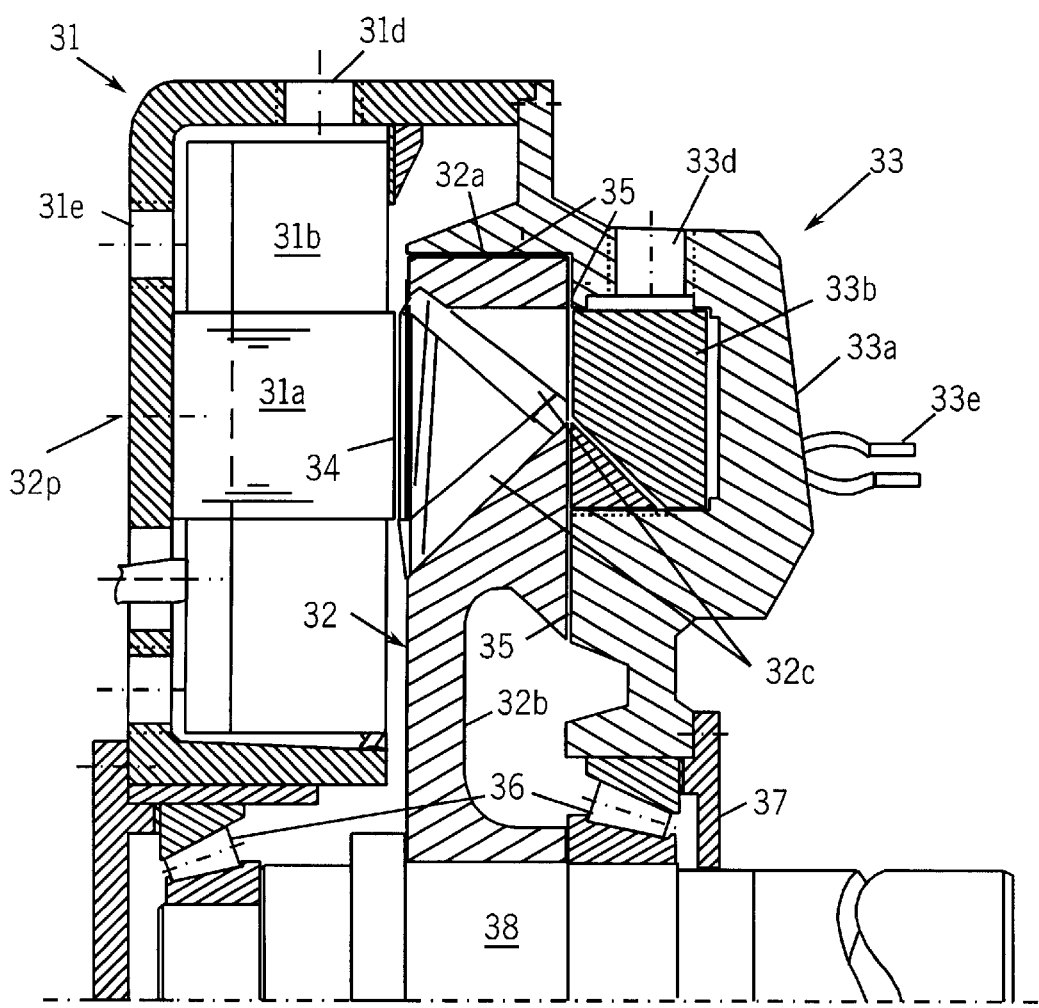
FIG. 6 is a quarter section view of a machine of the present invention incorporating the operating principles illustrated in FIGS. 5a–5c.

FIG. 6 shows a quarter section view of a brushless electrical machine 30 according to the present invention. The machine has an armature 31, a rotor 32, and a direct-current (DC) excitation stator portion 33. The first two components 31, 32 are separated by a main air gap 34 and the second two components 32, 33 are separated by a second air gap 35. The second air gap is as thin as machine clearance will allow between the two components 32, 33. A gap of 0.011 inches was used in one embodiment. The core portions of the armature 31 and the stator portion 33 as well as the rotor 32 are made of iron, one of many suitable steels or another iron alloy.

The armature 31 has a set of polyphase windings 31a and a magnetic core 31b. When phase currents energize the polyphase windings 31a they produce a rotating magnetic flux wave in the main air gap 34. The DC excitation portion 33 has a coil 33b for receiving direct current from an external source through leads 33e. This current can be of a first polarity illustrated in FIG. 5b, or of a second polarity as illustrated in FIG. 5c.

Figure 7A:
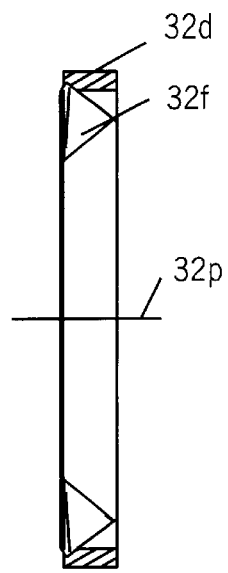
FIGS. 7a–7d are sectional and plan views of parts of a rotor assembly used in the machine of FIG. 6.
Figure 7B:
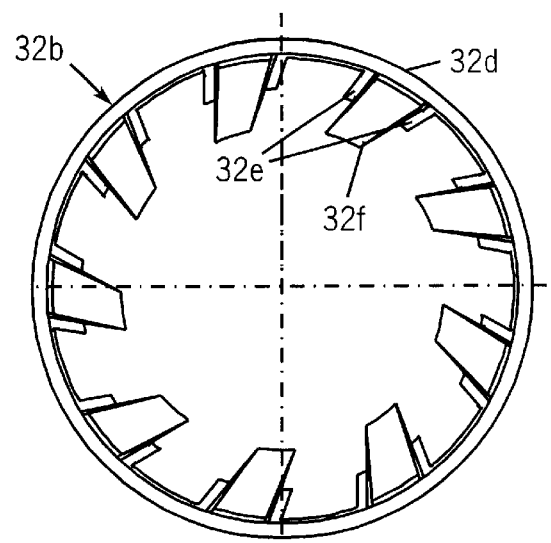
Figure 7C:
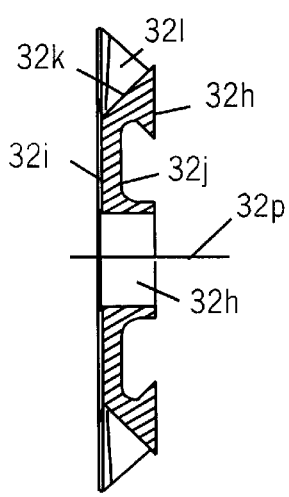
Figure 7D:
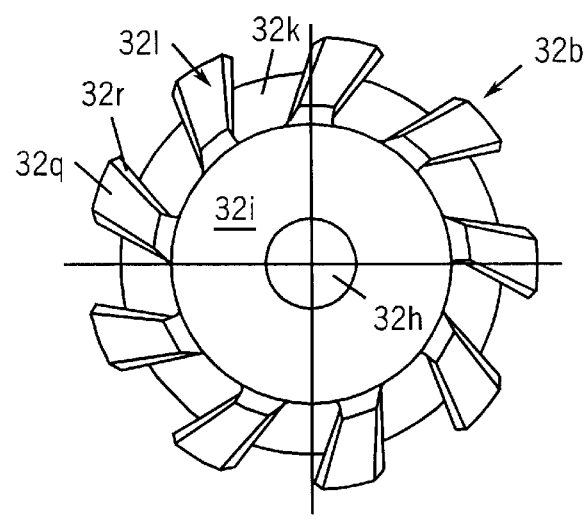

Referring to FIGS. 7a–7d, 8 and 9, the rotor has a front side (FIG. 8) which bounds the main air gap 34 in FIG. 6. The rotor also has a back side (FIG. 9) which bounds the secondary air gap 35 and the DC excitation stator portion 33 seen in FIG. 6. The rotor 32 is an assembly comprising an outer ring 32a and an inner ring 32b, which is shown in FIG. 7b and 7d, respectively. The outer ring 32a has a circular band of metal 32d with support flanges 32e slanted by a certain angle from radial. Between pairs of supports 32e, tooth-shaped pole pieces 32f of iron, steel or an iron alloy are welded or otherwise attached. The inner ring 32b is disk-shaped with a central hole 32h for a rotor shaft 38 seen in FIG. 6, with annular land 32i on the front side opposite an annular groove 32j on the back side and an annular land 32n on the back side forming canted or angled surfaces 32k. Tooth-shaped pole pieces 32 are spaced radially around the inner ring 32b provided spaces between them. The pole pieces 32l extend at an acute angle relative to radii from the axial center 32p.

Figure 8:
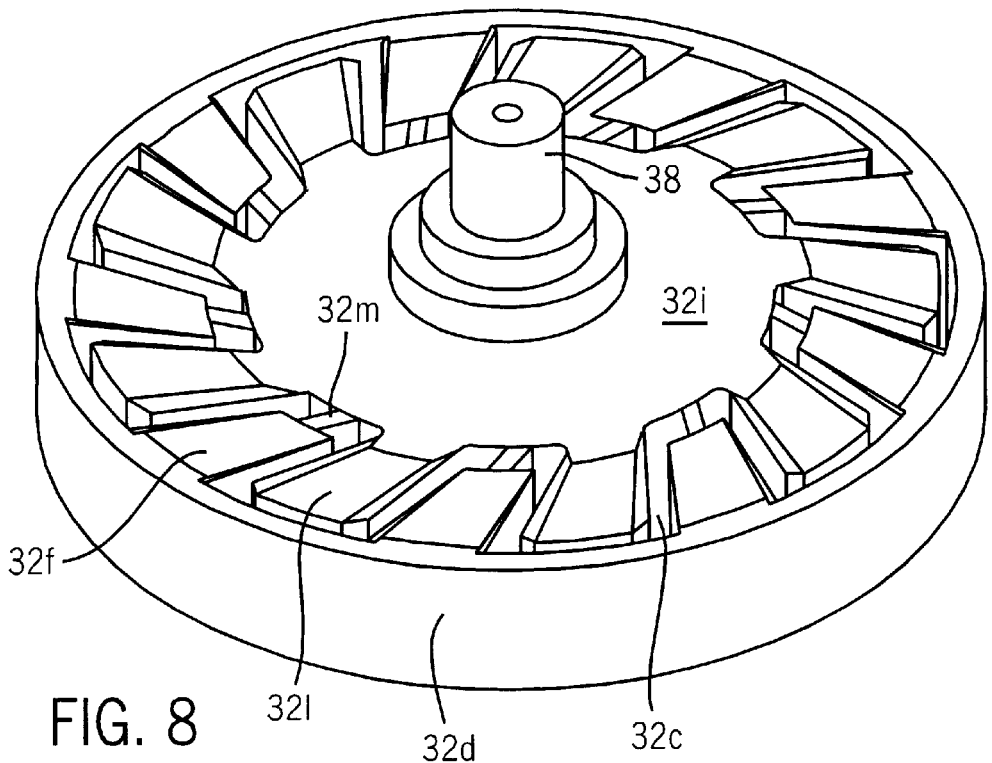
FIG. 8 is a perspective photographic view of a front side of prototype rotor as seen in FIGS. 7a–7d.
Figure 9:
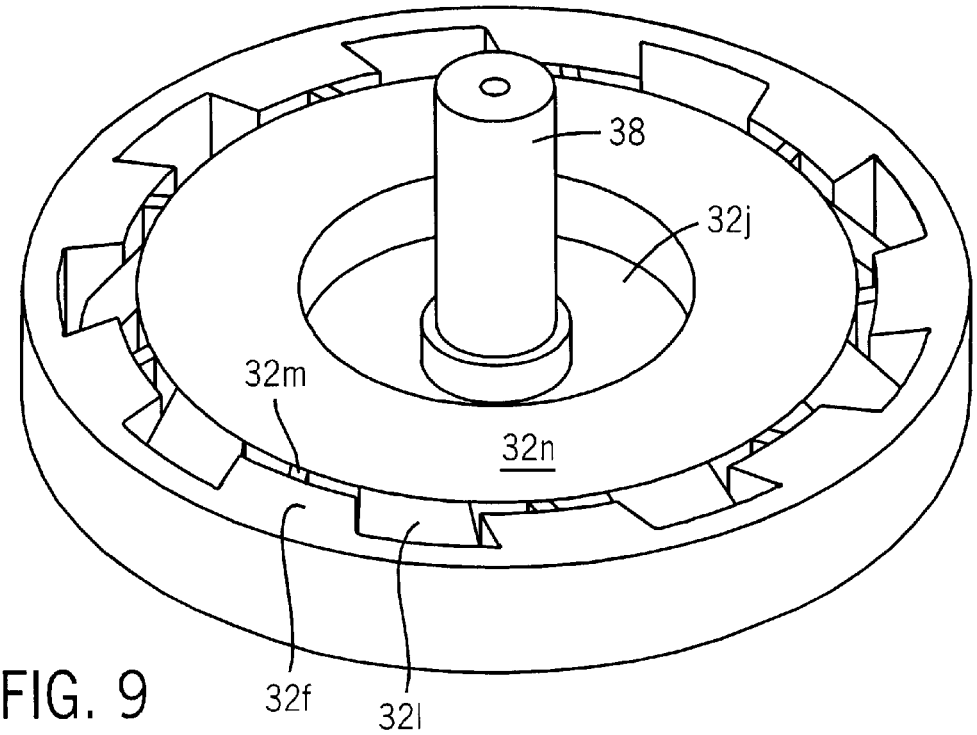
FIG. 9 is a perspective photographic view of a reverse side of a prototype rotor as seen in FIGS. 7a–7d.

As seen better in FIG. 8, pole pieces 32f on the outer ring 32a and pole pieces 32l on the inner ring 32b have flat sides 32q, 32s on the front side of the rotor 32 which faces the armature 31 and the main air gap 34 seen in FIG. 6. The flat surfaces 32q of pole pieces 32l have lateral angled flats 32r and these oppose similar flats (shown) on the undersides of pole pieces 32f. The pole pieces 32l, 32f are spaced apart when the rotor is assembled.

PM material is inserted in the spaces 32c between the pole pieces 32l, 32f seen in FIG. 8. The PM material produces the north and south poles on the side that faces the armature 31. Subsequently, the main air gap 34 (FIG. 6) between the armature 31 and the rotor 32 sees the rotor-side flux interacting with the armature flux induced by the armature coil 31b. This flux in the main air gap 34 can be either enhanced or weakened by the DC excitation stator section 33 (FIG. 6) that faces the other side of the rotor 32.

During the enhancement of air gap flux (previously described in relation to FIG. 5b) the PM material in the rotor 32 tends to prevent the diffusion of flux between the rotor pole pieces 32f, 32l (FIG. 8) More flux is guided to the main air gap 34 (FIG. 6) to interact with the armature flux.

During field weakening operation (previously described in relation to FIG. 5b) a great portion of the main air gap flux is drawn away from the air gap 34 by controlling the DC current of the DC excitation winding 20c, 33b. The dragging torque is greatly reduced by a lower flux density in the main air gap 34 between the armature 31 and the rotor 32.

FIG. 6 also shows that because both the armature winding and the stationary DC excitation winding are stationary, direct cooling of the stationary armature and excitation windings can be used as an option. A coolant can be circulated in conduits around the windings. The coolant is introduced through ports (threaded holes) 31d, 31e of the upper half of the machine 30 and exits from ports (additional threaded holes) in the lower half of the machine (not shown).

FIG. 6 also shows that the rotor 32 is mounted on a shaft 38 which is supported for rotation in bearings 36. The stationary DC excitation winding 33b and core 33a are supported on a frame of an armature 31.

Injected PM is used to fill in the gaps 32c between the rotor outer ring 32b and inner ring 32a of the machine 30. A high residual flux density and a strong coercive force provided by the PM aids the performance of the machine 30.

Thus, the invention provides a high strength undiffused brushless machine. The DC flux produced by an excitation coil 33b (FIG. 6) is delivered to the rotor 32 through an air gap 35 without the use of brushes. The DC flux in the rotor 32 is guided to the north and south poles that interact with the armature flux in the main air gap 34. The undiffused arrangement provided by PM elements 27b, 27c (see FIGS. 5b, 5c) guides the flux to the main air gap 34 facing the armature. Both the PM elements and the excitation coil 33b enhance the air-gap flux density. Consequently, a high air-gap torque for a given armature current can be obtained. By controlling the direction of the current in the additional stator excitation coil 33b, the main air-gap flux can be weakened, when desired. This motor requires only a simple power electronics drive of a type known in the art, which lowers the overall cost of a system using this machine. And, direct cooling of the stationary armature and excitation windings can be used as an option.

The invention is applicable to both AC synchronous and DC brushless machines and to both motors and generators. Although an axial gap machine is shown in FIG. 6, the invention is also applicable to radial gap machines.

This has been a description of the preferred embodiments of the invention. The present invention is intended to encompass additional embodiments including modifications to the details described above which would nevertheless come within the scope of the following claims.

I claim:

1. A brushless electric machine having a stator and a rotor spaced from the stator to define a main air gap, the stator producing a first flux in the rotor and the main air gap, the machine further comprising:

a rotor having an axis of rotation and having two rotor portions forming respective pluralities of rotor poles disposed at least partly around the axis of rotation and facing the main air gap, a first plurality of rotor poles being positioned alternately with the second plurality of rotor poles to form spaces between the two rotor portions and between the respective poles on the two rotor portions;

at least one stationary excitation coil for receiving direct current from an external source and being positioned next to the rotor so as to induce a second flux in the two rotor portions across a secondary air gap; and wherein PM material is disposed in the spaces between said two rotor portions and between the rotor poles of said two rotor portions for blocking the second flux from conduction between said two rotor portions when direct current in the stationary excitation coil is in one direction and wherein said PM material conducts the second flux between the two portions of the rotor when current in the stationary coil is in an opposite direction such that flux in the main air gap is weakened.

2. The machine of claim 1, wherein said main air gap is a first axial air gap between the stator and the rotor, and wherein said stationary coil is mounted on a portion of the stator separated from the rotor by a second axial air gap on a back side of the rotor opposite a front side facing the main air gap.

3. The machine of claim 2, wherein the portion of the stator mounting the stationary excitation coil is made of iron, steel or another iron alloy.

4. The machine of claim 2, wherein the portion of the stator supporting the stationary excitation coil is separated from the rotor by a machine tolerance clearance which forms the second axial air gap.

5. The machine of claim 1, wherein said rotor has at least two pairs of rotor poles and wherein the rotor poles are formed by teeth having faces with a shape substantially of a parallellogram.

6. The machine of claim 5, wherein said rotor is formed by inner ring and an outer ring, each of said inner ring and said outer ring having rotor poles separated by spaces for receiving rotor poles of the other one of said inner ring and said outer ring.

7. The machine of claim 1, wherein the stationary coil is one of a plurality of coils in a stationary winding for producing the second flux.

8. The machine of claim 7, further comprising means for circulating a coolant through the machine to cool the stator and to cool the stationary winding.

9. The machine of claim 1, wherein the machine is brushless AC synchronous machine.

10. The machine of claim 1, wherein the machine is a brushless DC machine.

11. The machine of claim 1, wherein the machine is a motor.

12. The machine of claim 1, wherein the machine is a generator.

13. A method of controlling flux in a brushless electrical machine having a stator with a primary excitation winding and a rotor separated by a main air gap, the rotor having at least two spaced apart portions facing the main air gap, the method comprising:

passing a current through the primary excitation winding to induce a first flux across the main air gap into the two portions of the rotor;

passing a direct current through a secondary excitation coil;

positioning said secondary excitation coil to induce a second flux in the two portions of the rotor from a position separated from the main air gap by at least the two portions of the rotor; and providing portions of PM material in spaces between the two portions of the rotor, wherein said PM material blocks the second flux induced in the rotor from passing between the two portions of the rotor when current in the secondary excitation coil is in one direction to increase total flux in the main air gap and wherein said PM material conducts the second flux between the two portions of the rotor when current in the secondary excitation coil is in an opposite direction to weaken flux in the main air gap.

14. The method of claim 13, wherein said stator further includes a stationary primary excitation winding and further comprising cooling said stationary primary excitation winding and said stationary coil by passing a cooling fluid through the machine.

15. The method of claim 13, wherein the machine is operated as a brushless AC synchronous machine.

16. The method of claim 13, wherein the machine is operated as a brushless DC machine.

17. The method of claim 13, wherein the machine is operated as a motor.

18. The method of claim 13, wherein the machine is operated as a generator.

* * * * *